United States Patent
Yamanaka

(10) Patent No.: US 12,457,421 B2
(45) Date of Patent: Oct. 28, 2025

(54) ELECTRONIC DEVICE, CONTROL METHOD, AND NON-TRANSITORY COMPUTER READABLE MEDIUM

(71) Applicant: CANON KABUSHIKI KAISHA, Tokyo (JP)

(72) Inventor: Yohei Yamanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 283 days.

(21) Appl. No.: 17/190,491

(22) Filed: Mar. 3, 2021

(65) Prior Publication Data
US 2021/0281733 A1 Sep. 9, 2021

(30) Foreign Application Priority Data

Mar. 6, 2020 (JP) .................... 2020-038856
Jan. 6, 2021 (JP) .................... 2021-000771

(51) Int. Cl.
*H04N 23/73* (2023.01)
*H04N 23/62* (2023.01)
(Continued)

(52) U.S. Cl.
CPC ............ *H04N 23/73* (2023.01); *H04N 23/62* (2023.01); *H04N 23/635* (2023.01); *H04N 23/67* (2023.01)

(58) Field of Classification Search
CPC .......... H04N 5/2353; H04N 5/232945; H04N 5/23212; H04N 5/23216; H04N 23/62;
(Continued)

(56) References Cited

U.S. PATENT DOCUMENTS

2013/0155309 A1 6/2013 Hill et al.
2013/0287313 A1 10/2013 Marchessoux
(Continued)

FOREIGN PATENT DOCUMENTS

CN 104427249 A 3/2015
CN 104639827 A 5/2015
(Continued)

OTHER PUBLICATIONS

Extended European Search Report issued in European Appln. No. 21160626.4 mailed on Jul. 12, 2021.
(Continued)

*Primary Examiner* — Antoinette T Spinks
(74) *Attorney, Agent, or Firm* — ROSSI, KIMMS & McDOWELL LLP

(57) ABSTRACT

An electronic device includes: a line-of-sight input unit configured to receive a line-of-sight input by a line of sight of a user who looks at a display; an acquisition unit configured to acquire an image that is captured by predetermined imaging control; a display control unit configured to display the acquired image on the display; a first operation unit configured to receive a first operation input by the user; a second operation unit configured to receive a second operation input by the user; and a control unit configured to, in a state where the image is displayed, perform setting of the predetermined imaging control on a basis of a line-of-sight position when the first operation input is performed, and perform image processing on the displayed image on a basis of the line-of-sight position when the second operation input is performed.

19 Claims, 6 Drawing Sheets

(51) Int. Cl.
*H04N 23/63* (2023.01)
*H04N 23/67* (2023.01)

(58) Field of Classification Search
CPC .. H04N 23/631; H04N 23/632; H04N 23/633; H04N 23/635; H04N 23/667; H04N 23/67; H04N 23/675; H04N 23/73; G02B 27/0093; G06F 3/013; G06F 3/0482; G06F 3/04842; G06F 3/04847
See application file for complete search history.

(56) References Cited

U.S. PATENT DOCUMENTS

| | | |
|---|---|---|
| 2015/0062402 A1 | 3/2015 | Kudo |
| 2015/0130740 A1* | 5/2015 | Cederlund ............. G02B 27/01 345/173 |
| 2021/0073364 A1* | 3/2021 | Sakai .................. G06V 40/172 |

FOREIGN PATENT DOCUMENTS

| | | |
|---|---|---|
| EP | 2608524 A1 | 6/2013 |
| JP | H07295017 A | 11/1995 |
| JP | 2006050163 A | 2/2006 |
| JP | 2009053296 A | 3/2009 |
| JP | 2014187574 A | 10/2014 |
| JP | 2014197109 A | 10/2014 |
| JP | 2015049544 A | 3/2015 |
| JP | 2015149552 A | 8/2015 |
| WO | 2013183533 A1 | 12/2013 |

OTHER PUBLICATIONS

Office Action issued in Chinese Appln. No. 202110244865.2 mailed Dec. 23, 2024.
Notification of Decision to Grant Patent Right issued in Chinese Appln. No. 202110244865.2 mailed Jul. 16, 2025.

* cited by examiner

FIG. 6
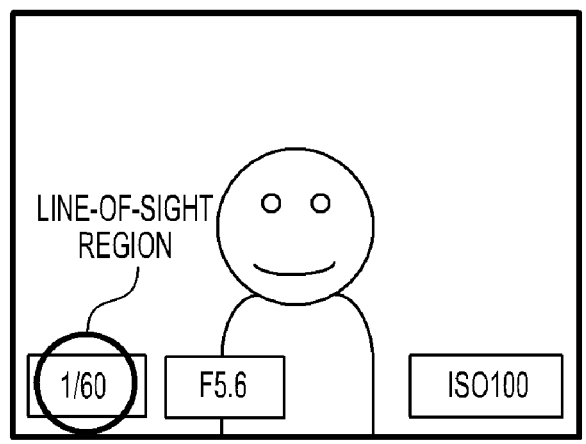
FIG. 7
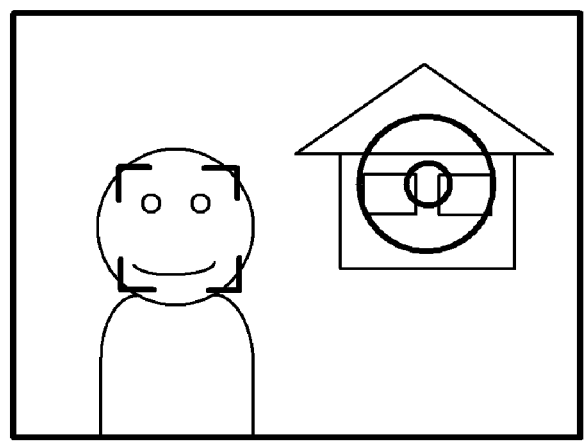
SW1 OPERATED
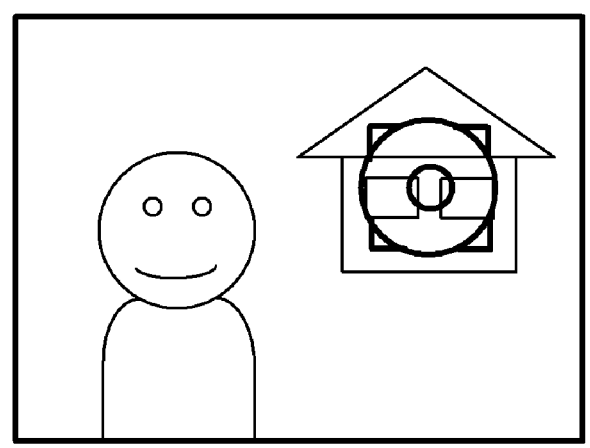

ELECTRONIC DEVICE, CONTROL METHOD, AND NON-TRANSITORY COMPUTER READABLE MEDIUM

BACKGROUND OF THE INVENTION

Field of the Invention

The present invention relates to an electronic device, and more particularly to an electronic device that can receive a line-of-sight input.

Description of the Related Art

Electronic devices of which operation is performed by a user using the line of sight of the user (hereafter line-of-sight input) are known. The line-of-sight input is particularly effective when the user wants to quickly instruct operation to an electronic device such as a digital camera and a game machine.

Japanese Patent Application Publication No. 2014-197109 discloses that a user attention region to which the user pays attention is determined, and based on this determination result, control is performed so as to differentiate the lightness of the user attention region from the lightness of a non-attention region, which is a region other than the user attention region, in a game image.

As a function (technique) related to cameras, a function to constantly perform focusing control by the line-of-sight input (control to receive a line-of-sight input and perform focusing at an AF frame position in accordance with the line-of-sight position (position at which the line-of-sight input is directed)) has been proposed. In this function, a user has to gaze at an object to be focused on, in a displayed live view image, without looking away from the object desired to be focused (desired to be brought into focus).

Further, by using the technique disclosed in Japanese Patent Application Publication No. 2014-197109, the brightness of the attention region of the line-of-sight input, out of the live view image, can be controlled (brightness control by the line-of-sight input).

However, if the function of the brightness control by the line-of-sight input is added to an electronic device which constantly performs focusing control by the line-of-sight input, the focusing control or the like may not be performed properly (may not be performed with favorable operability). For example, here, it is assumed that a user looks at an object B, which is different from an object A that is to be focused on, in a live view image in order to control the brightness of the object B. In this case, the brightness of the object B can be controlled as the user intends, but the focusing target is switched from the object A to the object B contrary to the user's intention. Further, in some cases, the user may check a region other than the object to be focused on, in order to confirm framing (composition). In a case of such checking as well, the focusing target may be switched contrary to the user's intention.

SUMMARY OF THE INVENTION

The present invention provides an electronic device which can perform a plurality of controls (processing operations) such as a focusing control and a brightness control by a line-of-sight input properly (with favorable operability).

An electronic device according to the present invention, includes at least one memory and at least one processor which function as: a line-of-sight input unit configured to receive a line-of-sight input by a line of sight of a user who looks at a display; an acquisition unit configured to acquire an image that is captured and acquired by predetermined imaging control; a display control unit configured to display the image, which is acquired by the acquisition unit, on the display; a first operation unit configured to receive a first operation input by the user; a second operation unit configured to receive a second operation input, which is different from the first operation input, by the user; and a control unit configured to, in a state where the image is displayed on the display by the display control unit, perform setting of the predetermined imaging control on a basis of a line-of-sight position, to which the line of sight is inputted, in a case where the first operation input is performed, and perform image processing on the image displayed on the display on a basis of the line-of-sight position in a case where the second operation input is performed.

Further features of the present invention will become apparent from the following description of exemplary embodiments with reference to the attached drawings.

BRIEF DESCRIPTION OF THE DRAWINGS

FIG. 6 is an example of changing imaging set values based on the line-of-sight position;
and
FIG. 7 is an example of AF control based on the line-of-sight position.

DESCRIPTION OF THE EMBODIMENTS

External View of Digital Camera 100

Figure 1A:
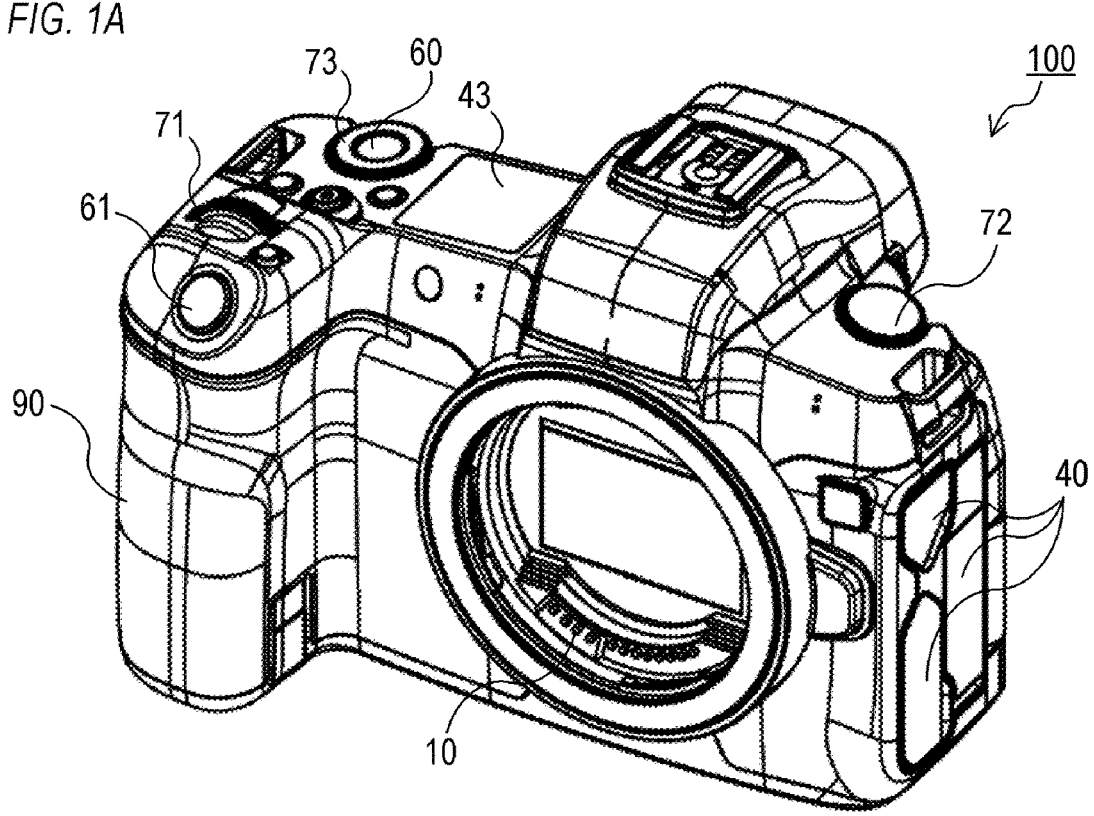
FIGS. 1A and 1B are external views of a digital camera.
Figure 1B:
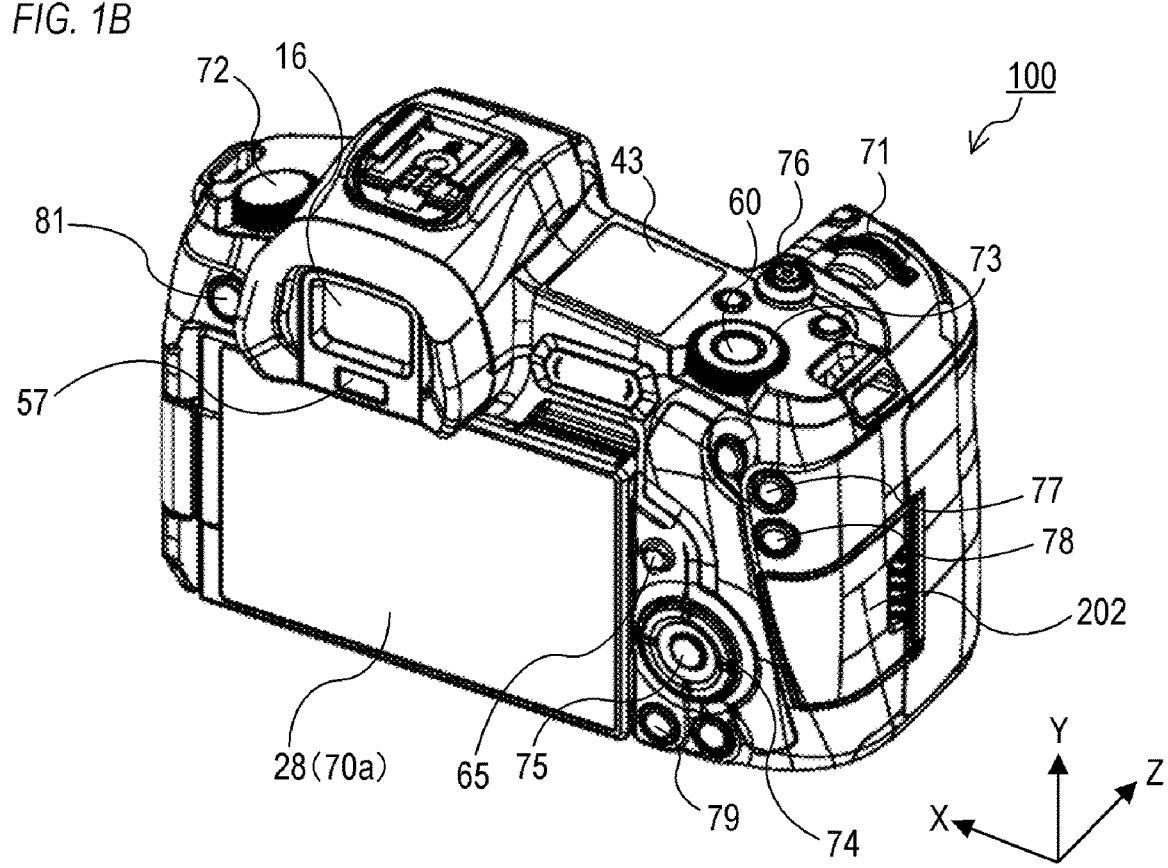

Preferred embodiments of the present invention will be described with reference to the drawings. FIGS. 1A and 1B are external views of a digital camera 100, which is an example of a device to which the present invention is applicable. FIG. 1A is a front perspective view of the digital camera 100, and FIG. 1B is a rear perspective view of the digital camera 100.

A display unit 28 is a display unit disposed on the rear surface of the digital camera 100, and displays images and various information. A touch panel 70a can detect the touch operation performed on a display surface (touch operation surface) of the display unit 28. A finder outer display unit 43 is a display unit disposed on an upper surface of the digital camera 100, and displays various set values of the digital camera 100, such as the shutter speed and aperture. The shutter button 61 is an operation member to instruct to capture an image. A mode selection switch 60 is an operation member to switch between various modes. Terminal covers 40 are covers to protect connectors (not illustrated) to connect the digital camera 100 to an external device.

A main electronic dial 71 is a rotational operation member, and such set values as the shutter speed and aperture can be changed by turning the main electronic dial 71. A power switch 72 is an operation member to switch the power supply of the digital camera 100 ON/OFF. A sub-electronic dial 73 is a rotational operation member, and movement of a selection frame (cursor) and image switching, for example, can be performed by turning the sub-electronic dial 73. A four-direction key 74 is configured such that the upper part, lower part, left part and right part of the key can be pressed respectively, so that a processing corresponding to the pressed part of the four-direction key 74 can be performed. A SET button 75 is a push button, and is mainly used to determine a selected item.

A video button 76 is used to start or stop capturing (recording) moving images. An AE lock button 77 is a push button, and an exposure state can be fixed by pressing the AE lock button 77 in an image capturing standby state. A magnifying button 78 is an operation button to switch a magnifying mode ON/OFF in a live view display (LV display) of an image capturing mode. If the main electronic dial 71 is operated after setting the magnifying mode to ON, the live view image (LV image) can be magnified or demagnified. In a reproduction mode, the magnifying button 78 functions as an operation button to magnify a reproduced image or to increase the magnification ratio thereof. A reproduction button 79 is an operation button to switch between the image capturing mode and reproduction mode. If the reproduction button 79 is pressed in the image capturing mode, the mode changes to the reproduction mode, in which the latest image, out of the images recorded in a recording medium 200 (described later), can be displayed on the display unit 28. A menu button 81 is a push-button, and if the menu button 81 is pressed, the menu screen, which allows various settings, is displayed on the display unit 28. The user can intuitively perform various settings using the menus screen displayed on the display unit 28, the four-direction key 74, the SET button 75, a multi-controller (MC) 65, and the like. The MC 65 can perform operation to instruct a direction out of 8 directions, and receive the operation performed by pressing a center portion thereof.

A communication terminal 10 is a communication terminal for the digital camera 100 to communicate with a detachable lens unit 150 (described later). An eye piece 16 is an eye piece portion of an eye piece finder (peep type finder), and the user can view an image displayed on an internal electric view finder (EVF) 29 (described later) via the eye piece 16. An eye contact detection unit 57 is an eye contact detection sensor to detect whether an eye of the user is contacting the eye piece 16. A cover 202 is a cover of a slot to store a recording medium 200 (described later). A grip 90 is a holding unit having such a shape that the user can easily hold the digital camera 100 with their right hand to capture images. When the user holds the digital camera 100 by gripping the grip 90 with their little finger, ring finger and middle finger, the mode selection switch 60, the shutter button 61, the main electronic dial 71, the video button 76 and the like are in positions that can be operated by the index finger of the right hand. In this state, the MC 65, the touch panel 70a, the sub-electronic dial 73, the four-direction key 74, the SET button 75, the AE lock button 77, the magnifying button 78, the reproduction button 79, and the like are disposed in positions that can be operated by the thumb of the right hand.

Block Diagram of Digital Camera 100

Figure 2:
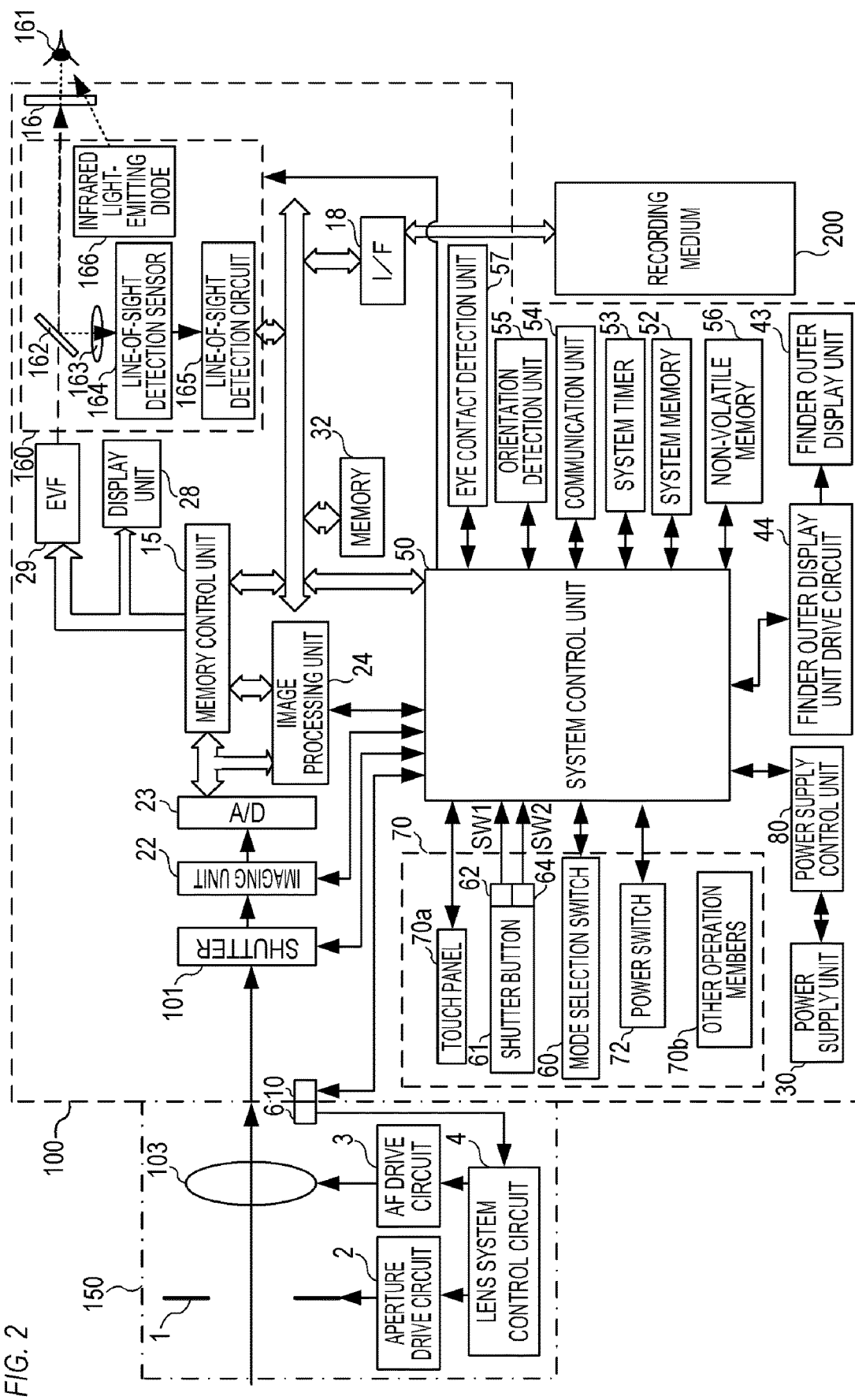
FIG. 2 is a block diagram of the digital camera.

FIG. 2 is a block diagram depicting a configuration example of the digital camera 100. A lens unit 150 is a lens unit equipped with a replaceable image capturing lens. A lens 103 is normally constituted of a plurality of lenses, but is illustrated as one lens in FIG. 2 for simplification. A communication terminal 6 is a communication terminal for the lens unit 150 to communicate with the digital camera 100, and a communication terminal 10 is a communication terminal for the digital camera 100 to communicate with the lens unit 150. The lens unit 150 communicates with a system control unit 50 via these communication terminals 6 and 10. Then the lens unit 150 controls an aperture 1 via an aperture drive circuit 2, using an internal lens system control circuit 4. The lens unit 150 also performs focusing by moving the lens 103 via an AF drive circuit 3 using the lens system control circuit 4.

A shutter 101 is a focal plane shutter which can freely control the exposure time of an imaging unit 22 based on the control by the system control unit 50.

The imaging unit 22 is an image pickup element (image sensor) constituted of a CCD, a CMOS element or the like, to convert an optical image into electric signals. The imaging unit 22 may include an imaging plane phase-difference sensor, which outputs defocus amount information to the system control unit 50. An A/D convertor 23 is used to convert analog signals outputted from the imaging unit 22 into digital signals.

An image processing unit 24 performs predetermined processing (pixel interpolation, resizing processing (e.g. demagnification), color conversion processing, or the like) on the data from the A/D convertor 23 or the data from a memory control unit 15. The image processing unit 24 also performs predetermined arithmetic processing using the captured image data, and the system control unit 50 performs exposure control and distance measurement control based on the arithmetic result acquired by the image processing unit 24. Thereby through-the-lens (TTL) type auto focus (AF) processing, auto exposure (AE) processing, pre-flash emission (EF) processing, and the like are performed. Furthermore, the image processing unit 24 performs predetermined arithmetic processing using the captured image data, and performs TTL type auto white balance (AWB) processing based on the acquired arithmetic result.

The memory control unit 15 controls data transmission/reception among the A/D convertor 23, the image processing unit 24 and the memory 32. The output data from the A/D convertor 23 is written to the memory 32 via the image processing unit 24 and the memory control unit 15. In some cases, the output data from the A/D convertor 23 is written to the memory 32 via the memory control unit 15 without using the image processing unit 24. The memory 32 stores image data which was acquired by the imaging unit 22 and converted into digital data by the A/D convertor 23, and stores image data to be displayed on the display unit 28 or the EVF 29. The memory 32 has a storage capacity that is sufficient to store a predetermined number of still images and a predetermined duration of moving images and sounds.

The memory 32 is also a memory for image display (video memory). The image data for display, which is written in the memory 32, is displayed on the display unit 28 or the EVF 29 via the memory control unit 15. The display unit 28 and the EVF 29 perform display in accordance with the signals from the memory control unit 15 respectively, on such a display as an LCD and an organic EL. If data, which was A/D converted by the A/D convertor 23 and stored in the memory 32, is sequentially transferred to and displayed on the display unit 28 or the EVF 29, live view display (LV display) can be performed. An image displayed on the live view display is referred to as a live view image (LV image) herein below.

A line-of-sight detection unit 160 detects line of sight of the user at the eye piece 16. The line-of-sight detection unit 160 is constituted of a dichroic mirror 162, an image forming lens 163, a line-of-sight detection sensor 164, a line-of-sight detection circuit 165 and an infrared light-emitting diode 166. The line-of-sight detection unit 160 may be regarded as a part of the operation unit 70, since the system control unit 50 may execute predetermined processing in accordance with the detection of the line of sight.

In this embodiment, the line-of-sight detection unit 160 detects the line of sight by a corneal reflex method. The corneal reflex method is a method of detecting a direction, position, and the like of the line of sight based on the positional relationship between: reflected light generated when an infrared light emitted from an infrared light-emitting diode 166 is reflected by an eyeball (eye) 161 (particularly light reflected by the cornea); and a pupil of the eyeball (eye) 161. For the method used for the line-of-sight detection unit 160, not only the corneal reflex method but also various other methods of detecting the direction, position, and the like of the line of sight may be used. For example, a scleral reflex method, which uses the difference of reflectances of the light between an iris and white of the eye, may be used.

The infrared light-emitting diode 166 is a light-emitting element to detect a line-of-sight position of the user in a finder screen, and emits an infrared light to an eyeball (eye) 161 of the user which is in contact with the eye piece 16. The infrared light emitted from the infrared light-emitting diode 166 is reflected by the eyeball (eye) 161, and this infrared reflected light reaches the dichroic mirror 162. The dichroic mirror 162 reflects only the infrared light, and allows visible light to pass. The infrared reflected light, of which optical path is changed, forms an image on an imaging surface of the line-of-sight detection sensor 164 via the image forming lens 163. The image forming lens 163 is an optical member which constitutes the line-of-sight detection optical system. The line-of-sight detection sensor 164 is constituted of an imaging device, such as a CCD type image sensor.

The line-of-sight detection sensor 164 performs photo-electric conversion on the entered infrared reflected light, and outputs the generated electric signals to the line-of-sight detection circuit 165. The line-of-sight detection circuit 165 includes at least one processor, and detects the line-of-sight position of the user from the image or the movement of the eyeball (eye) 161 of the user, based on the output signals of the line-of-sight detection sensor 164, and outputs the detected information to the system control unit 50.

On the finder outer display unit 43, various set values of the camera, such as the shutter speed and aperture, are displayed via a finder outer display unit drive circuit 44.

A non-volatile memory 56 is a memory which is electrically erasable and recordable, such as a Flash-ROM. In the non-volatile memory 56, constants and programs for operating the system control unit 50, for example, are recorded. "Programs" here refers to computer programs for executing various flow charts described later in this embodiment.

The system control unit 50 is a control unit constituted of at least one processor or circuit, and controls the digital camera 100 in general. The system control unit 50 implements each processing step of this embodiment (described later) by executing the programs recorded in the above mentioned non-volatile memory 56. A system memory 52 is a RAM, for example, and the system control unit 50 develops the constants and variables for operating the system control unit 50 and programs read from the non-volatile memory 56, in the system memory 52. The system control unit 50 also controls the display by controlling the memory 32, the display unit 28, the EVF 29, and the like.

The systems timer 53 is a clock unit that measures the time used for various controls and the time of the internal clock.

The power supply control unit 80 is constituted of a battery detection circuit, a DC-DC convertor, a switch circuit to switch blocks to be energized, and the like, and detects whether a battery is installed, a type of battery, and the residual amount of battery power, for example. The power supply control unit 80 also controls the DC-DC convertor based on this detection result and the instruction from the system control unit 50, and supplies the required voltage to each unit, including the recording medium 200, for a required period of time. A power supply unit 30 constituted of a primary battery (e.g. alkali battery, lithium battery), a secondary battery (e.g. NiCd battery, NiMH battery, Li battery), and AC adapter, and the like.

A recording medium I/F 18 is an interface with the recording medium 200 (e.g. memory card, hard disk). The recording medium 200 is a recording medium to record captured images, such as a memory card, and is constituted of a semiconductor memory, a magnetic disk, or the like.

A communication unit 54 transmits/receives video signals and sound signals to/from an external device connected wirelessly or via cable. The communication unit 54 can also be connected with a wireless local area network (LAN) and Internet. The communication unit 54 can also communicate with an external device via Bluetooth (registered trademark) or Bluetooth Low Energy. The communication unit 54 can transmits an image (including an LV image) captured by the imaging unit 22 and an image recorded in the recording medium 200, and can receive image data and various other information from an external device.

An orientation detection unit 55 detects an orientation of the digital camera 100 with respect to the direction of gravity. Based on the orientation detected by the orientation detection unit 55, it can be determined whether an image captured by the imaging unit 22 is an image that was captured by the digital camera 100 held horizontally, or an image that was captured by the digital camera 100 held vertically. The system control unit 50 can attach the orientation information, which is in accordance with the orientation detected by the orientation detection unit 55, to an image file of an image captured by the imaging unit 22, or can rotate and record the image. For the orientation detection unit 55, an acceleration sensor, a gyro sensor, or the like can be used. The motion of the digital camera 100 (e.g. pan, tilt, lift, still) can be detected using the acceleration sensor or gyro sensor of the orientation detection unit 55.

The eye contact detection unit 57 is an eye contact detection sensor that detects the approach (contact) and the withdrawal (release) of an eye (object) 161 to/from the eye piece 16 of the eye piece finder (finder). The system control unit 50 switches the display unit 28 and the EVF 29 between the display (display state) and the non-display (non-display state) in accordance with the state detected by the eye contact detection unit 57. Specifically, in the case where the digital camera 100 is at least in the image capturing standby state and the display destination switching setting of the live view image captured by the imaging unit 22 is set to automatic switching, the display destination is set to the display unit 28 (display of the display unit 28 is ON) and the EVF 29 is set to non-display in the non-eye contact state. In the eye contact state, on the other hand, the display destination is set to the EVF 29 (display of the EVF 29 is ON), and the display unit 28 is set to non-display. For the eye contact detection unit 57, an infrared proximity sensor, for example, can be used, so as to detect the approach of an object to the eye piece 16 of the finder which includes the EVF 29. When an object approaches, the infrared light emitted from the light-emitting unit (not illustrated) of the eye contact detection unit 57 is reflected by the object, and is received by a light-receiving unit (not illustrated) of the infrared proximity sensor. The distance of the object to the eye piece 16 (eye piece distance) can also be determined by the amount of the received infrared light. In this way, the eye contact detection unit 57 performs eye contact detection to detect the proximity distance of the object to the eye piece 16. In the present embodiment, it is assumed that the light-emitting unit and the light-receiving unit of the eye contact detection unit 57 are devices separate from the above mentioned infrared light-emitting diode 166 and the line-of-sight detection sensor 164. However, the functions of the light-emitting unit of the eye contact detection unit 57 may be served by the infrared light-emitting diode 166, and the light-receiving unit of the eye contact detection unit 57 may be served by the line-of-sight detection sensor 164. Further, in the present embodiment, it is assumed that eye contact is detected in the case where an object that approaches the eye piece 16 by less than a predetermined distance is detected after the non-eye contact state (non-approaching state). It is also assumed that eye withdrawal is detected in the case where an object, of which approach was detected, moved away from the eye contact state (approaching state) by at least a predetermined distance. The threshold to detect the eye contact and the threshold to detect the eye withdrawal may be differentiated by hysteresis, for example. After the eye contact is detected, it is assumed that the eye contact state continues until the eye withdrawal is detected. Then after the eye withdrawal is detected, it is assumed that the non-eye contact state continues until the eye contact is detected. It should be noted that the infrared proximity sensor is merely an example, and another type of sensor may be used for the eye contact detection unit 57, as long as the sensor can detect the approach of an eye or an object that can be regarded as eye contact.

The system control unit 50 can detect the following operations performed to the eye piece 16, or the state thereof, based on the output from the line-of-sight detection unit 160.

a line of sight, which is not turned to the eye piece 16, turns the eye piece 16, that is, the line-of-sight input starts.

a line of sight is being inputted to the eye piece 16.

the eye piece 16 is being gazed into (e.g. a state of line-of-sight input where the line-of-sight position of the user does not move exceeding the predetermined moving amount within a predetermined time).

a line of sight, which is turning to the eye piece 16, turns away, that is, the line-of-sight input ends.

a line of sight is not inputted into the eye piece 16.

These operations, states and positions (directions) of the line of sight, with respect to the eye piece 16, are notified to the system control unit 50 via the internal bus, and based on the notified information, the system control unit 50 determines the kind of operation (line-of-sight operation) that was performed on the eye piece 16.

The operation unit 70 is an input unit that receives an operation performed by the user (user operation), and is used to input various operation instructions to the system control unit 50. As illustrated in FIG. 2, the operation unit 70 includes the mode selection switch 60, the shutter button 61, the power switch 72, the touch panel 70a, and other operation members 70b. The other operation members 70b include the MC 65, the main electronic dial 71, the sub-electronic dial 73, the four-direction key 74, the SET button 75, the video button 76, the AE lock button 77, the magnifying button 78, the reproduction button 79 and the menu button 81.

The mode selection switch 60 switches the operation mode of the system control unit 50 to a still image capturing mode, a moving image capturing mode, a reproduction mode, or the like. The modes included in the still image capturing mode are: auto image capturing mode, auto scene determination mode, manual mode, aperture priority mode (Av mode), shutter speed priority mode (Tv mode) and program AE mode (P mode). Various scene modes and custom modes, to perform image capturing settings for each image capturing scene, are also included. The user can directly select any one of these modes using the mode selection switch 60. The user may also select an image capturing mode list screen using the mode selection switch 60 first, then select any one of the plurality of modes displayed on the list using another operation member. In the same manner, a plurality of modes may be included in the moving image capturing mode.

The shutter button 61 includes a first shutter switch 62 and a second shutter switch 64. The first shutter switch 62 is turned ON in mid-operation of the shutter button 61, that is, in the half-depressed state (image capturing preparation instruction), and generates a first shutter switch signal SW1. By the first shutter switch signal SW1, the system control unit 50 starts an image capturing preparation operation, such as auto focus (AF) processing, auto exposure (AE) processing, auto white balance (AWB) processing, and pre-flash emission (EF) processing. The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing, from reading signals from the imaging unit 22 to writing the captured image to the recording medium 200, as an image file.

The touch panel 70a and the display unit 28 may be integrated. For example, the touch panel 70a is configured so that the transmittance of the light does not interfere with the display on the display unit 28, and is superimposed on the upper layer of the display surface of the display unit 28. Then the input coordinates on the touch panel 70a are corresponded with the display coordinates on the display surface of the display unit 28. Thereby a graphical user interface (GUI), which allows the user to directly operate the screen displayed on the display unit 28, can be provided. The system control unit 50 can detect the following operations on the touch panel 70a or the state thereof.

a finger or pen which is not touching the touch panel 70a touches the touch panel 70a, that is, touch starts (hereafter Touch-Down).

a finger or pen is touching the touch panel 70a (hereafter Touch-On).

a finger or pen is moving in the state of touching the touch panel 70a (hereafter Touch-Move).

a finger or pen, which is touching the touch panel 70a, is released from the touch panel 70a, that is, touch ends (hereafter Touch-Up).

nothing is touching the touch panel 70a (hereafter Touch-Off).

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers or pen is detected.

These operations, states and coordinates of the positions of the fingers or pen touching the touch panel 70a are notified to the system control unit 50 via the internal bus. Then based on the notified information, the system control unit 50 determines the type of operation (touch operation) that was performed on the touch panel 70a. For Touch-Move, the system control unit 50 can also determine the moving direction of the fingers or pen moving on the touch panel 70a, based on the change of the positional coordinates, for the vertical components and the horizontal components on the touch panel 70a respectively. If Touch-Move is detected for at least a predetermined distance, the system control unit 50 determines that the slide operation was performed. An operation of quickly moving a finger on the touch panel 70a for a certain distance in the touched state and then released is called "flick". In other words, flick is an operation of moving and releasing a finger rapidly on the touch panel 70a. If Touch-Move is detected for at least a predetermined distance at at least a predetermined speed, and Touch-Up is detected thereafter, the system control unit 50 determines that flick was performed (determines that flick was performed after the slide operation). Further, a touch operation of touching a plurality of points (e.g. 2 points) simultaneously and moving these touch positions closer together is called "Pinch-In", and a touch operation of moving these touch positions further apart is called "Pinch-Out". Pinch-In and Pinch-Out are collectively called a pinch operation (or simply "pinch"). For the touch panel 70a, various types of touch panels may be used, such as resistive film type, a capacitive type, a surface acoustic wave type, an infrared type, an electromagnetic induction type, an image recognition type and an optical sensor type. There is a type of detecting touch when the touch panel is actually contacted, and a type of detecting touch when a finger or pen approaches the touch panel, and either type may be used.

In accordance with the user operation to the operation unit 70, the system control unit 50 can set the method of specifying the index position (e.g. AF position (position of AF frame)) using the touch operation to an absolute position specification or to a relative position specification. For example, in the case of the absolute position specification, when the touch panel 70a is touched, the system control unit 50 sets the index position corresponding to this touch position. In other words, the positional coordinates (input coordinates) where the touch operation is performed is corresponded to the positional coordinates (display coordinates) on the display unit 28. In the case of the relative position specification, on the other hand, the positional coordinates where the touch operation is performed and the positional coordinates on the display unit 28 are not corresponded. In the relative position specification, the system control unit 50 moves the index position from the currently set index position in the moving direction of Touch-Move by a distance corresponding to the moving amount of Touch-Move, regardless the position of Touch-Down on the touch panel 70a.

Operation of Digital Camera 100

Figure 3:
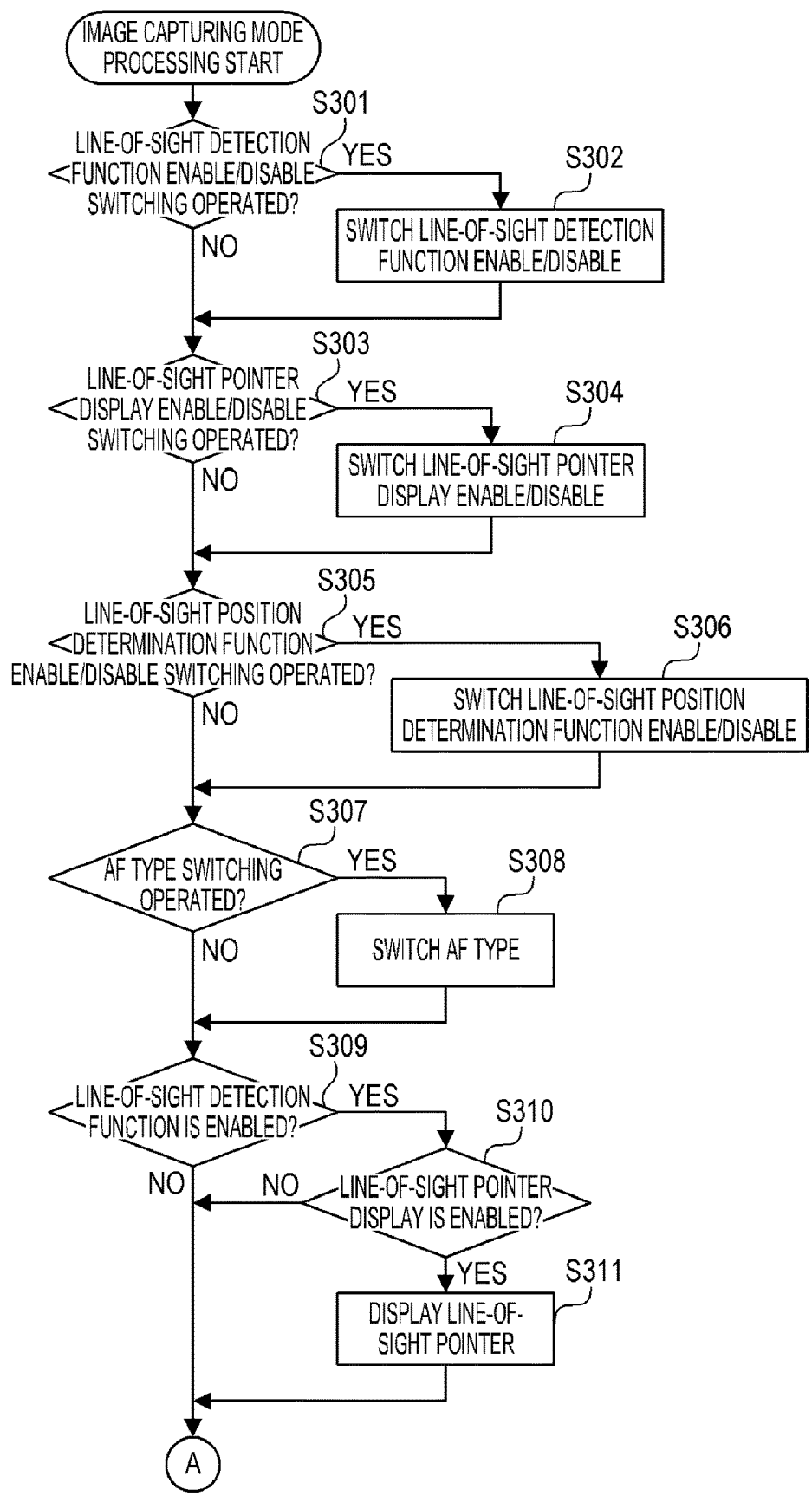
FIG. 3 is a part of a flow chart depicting an image capturing mode processing.
Figure 4:
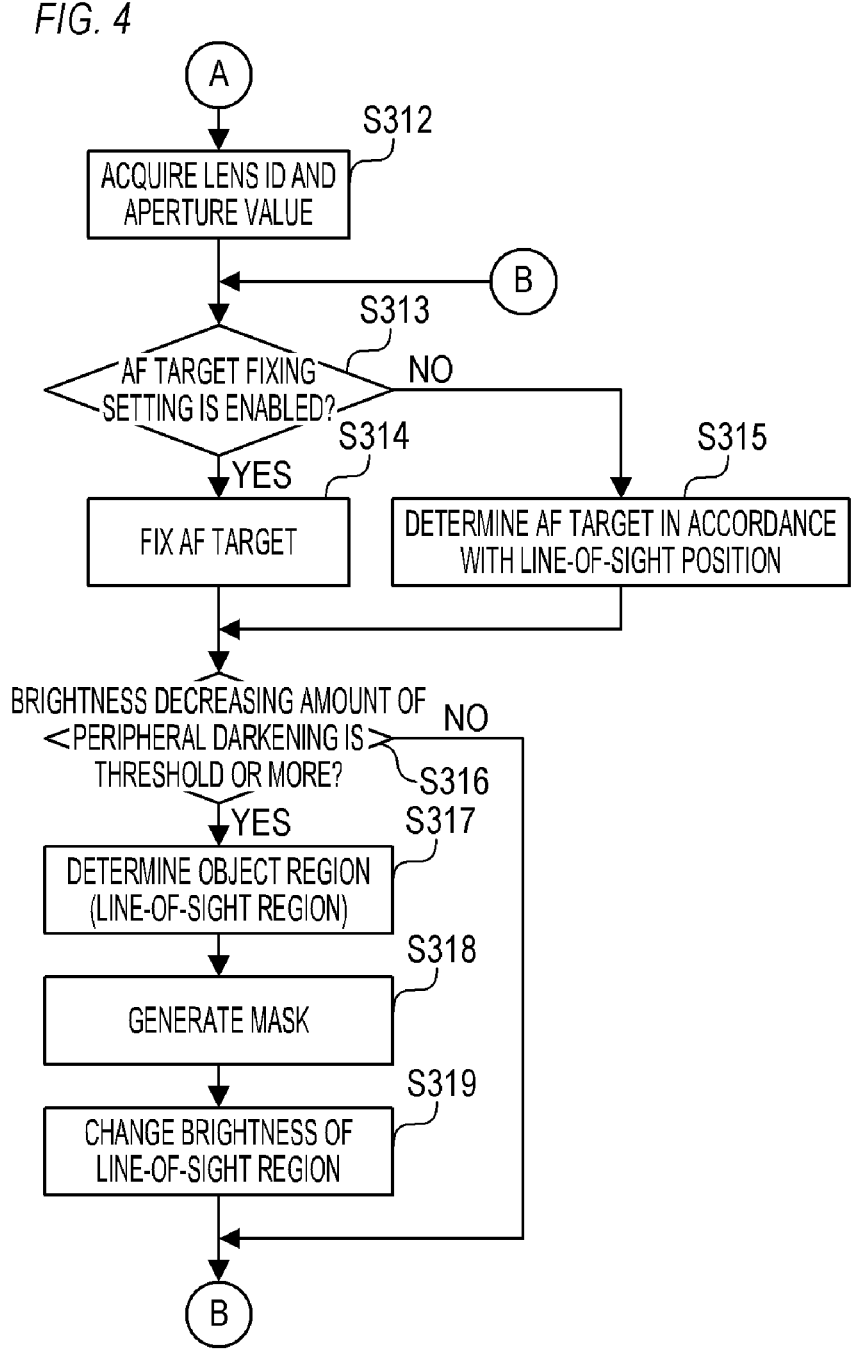
FIG. 4 is a part of the flow chart depicting the image capturing mode processing.

FIGS. 3 and 4 indicate a flow chart depicting details on the image capturing mode processing that is performed by the digital camera 100. This processing is implemented by the system control unit 50 developing programs, which are recorded in the non-volatile memory 56, in the system memory 52, and executing the programs. For example, when the digital camera 100 is started in the image capturing mode, or when the system control unit 50 switches the current mode to the image capturing mode, the system control unit 50 initializes flags, control variables, and the like, and then displays a live view image captured by the imaging unit 22 on the display unit 28 and the EVF 29. Further, based on camera set values, the system control unit 50 displays the information icons, which indicate the camera set values, so as to be superimposed on the live view image. Then the system control unit 50 starts the image capturing mode processing in FIGS. 3 and 4.

In S301 in FIG. 3, the system control unit 50 determines whether an operation to switch enable/disable of the line-of-sight detection function was performed on the operation unit 70. Processing advances to S302 if the operation was performed, or to S303 if not.

In S302, the system control unit 50 changes the camera set value so that enable/disable of the line-of-sight detection function is switched in accordance with the operation in S301.

In S303, the system control unit 50 determines whether an operation to switch enable/disable of the line-of-sight pointer display was performed on the operation unit 70. Processing advances to S304 if the operation was performed or to S305 if not. The line-of-sight pointer is a display item (indicator) that indicates a line-of-sight position (position to which a line of sight is inputted) in the eye piece 16 (display surface of the EVF 29), and is displayed at the line-of-sight position.

In S304, the system control unit 50 changes the camera set value so that the enable/disable of the line-of-sight pointer display is switched in accordance with the operation in S303.

In S305, the system control unit 50 determines whether an operation to switch enable/disable of the line-of-sight position determination function, to determine the line-of-sight position in accordance with the pressing (ON) of the first shutter switch 62, was performed on the operation unit 70. Processing advances to S306 if the operation was performed, or to S307 if not.

In S306, the system control unit 50 changes the camera set value so that enable/disable of the line-of-sight position determination function is switched in accordance with the operation in S305.

In S307, the system control unit 50 determines whether the operation to switch the setting of the AF type was performed on the operation unit 70. Processing advances to S308 if the operation was performed, or to S309 if not.

In S308, the system control unit 50 changes the camera set value so that the setting of the AF type is switched in accordance with the operation in S307.

In S309, the system control unit 50 determines whether the line-of-sight detection function is enabled. Processing advances to S310 if enabled, or to S312 (FIG. 4) if not.

In S310, the system control unit 50 determines whether the line-of-sight pointer display is enabled. Processing advances to S311 if enabled, or to S312 (FIG. 4) if not.

In S311, the system control unit 50 acquires information on the line-of-sight position from the line-of-sight detection unit 160, and displays the line-of-sight pointer at the line-of-sight position on the display surface of the EVF 29.

In S312, the system control unit 50 acquires a current lens ID (identification information (individual information) to identify the lens unit 150) and an aperture value that is currently set. For example, the system control unit 50 acquires the lens ID and the aperture value from the lens unit 150. The system control unit 50 may acquire the lens ID and the aperture value from the lens unit 150, and record the lens ID and the aperture value to the system memory 52 in advance. Then in S312, the system control unit 50 may acquire the lens ID and the aperture value from the system memory 52.

In S313, the system control unit 50 determines whether the AF target fixing setting is enabled or not. The AF target fixing setting is a setting (function) to fix an AF target (an object to be focused on; an object on which focus (focal point) is set). Processing advances to S314 if enabled, or to S315 if not. The AF target may be regarded as a focal point detection region to focus on a corresponding object.

The system control unit 50 can switch enable/disable of the AF target fixing setting in accordance with an operation performed on the operation unit 70 (operation input). For example, enable/disable of the AF target fixing setting is switched in accordance with the operation to an operation member, which can be operated while pressing the shutter button 61, such as the AF-ON button, AEL button, AF-SEL button, touch panel, built-controller, OTP, preview button, and the like. The operation member to enable the AF target fixing setting and the operation member to disable the AF target fixing setting may or may not be different from each other. The system control unit 50 may switch enable/disable of the AF target fixing setting by toggling in accordance with the operation performed on a specific operation member (one operation member). Specifically, if the AF target fixing setting is disabled, the system control unit 50 may enable the AF target fixing setting in accordance with the operation to a specific operation member, and if the AF target fixing setting is enabled, the AF target fixing setting may be disabled in accordance with the operation to the specific operation member. The user may switch enable/disable of the AF target fixing setting on the menu screen.

In the present embodiment, in the case where the AF target fixing setting is disabled, the system control unit 50 determines an object, which is displayed at the line-of-sight position (position where line of sight is inputted) out of the live view image, as the AF target, and controls so that the determined object is focused on. Therefore if the line-of-sight position changes so as to see an object that is different from the AF target object, the AF target is switched to the object located at the line-of-sight position. Then when the AF target fixing setting is switched from disable to enable, the system control unit 50 fixes the AF target to the focused object (AF target before switching the AF target fixing setting), and controls so as to continue focusing on this object. In the case where the AF target fixing setting is enabled as well, the AF target is not switched even if the line-of-sight position changes to see an object that is different from the AF target object.

In S314, the system control unit 50 fixes the AF target regardless the line-of-sight position. Thereby the AF target is not changed even if the line of sight is shifted from the AF target, hence the framing (composition) can be checked and the operation intended by the user can be performed.

In S315, the system control unit 50 determines an AF target in accordance with the line-of-sight position. In the case where the line-of-sight position changes to see an object that is different from the AF target object, the system control unit 50 switches the AF target to the object located at the line-of-sight position.

Depending on the lens unit 150 (e.g. type of lens, aperture), the brightness of the live view image may decrease in the direction from the center to the edge of the live view image (peripheral darkening). In S316, the system control unit 50 calculates the brightness decreasing amount of the peripheral darkening (decreasing amount of the brightness of the image from the center to the edge of the image) based on the lens ID and the aperture value acquired in S312, and determines whether the brightness decreasing amount is at least a predetermined threshold. The brightness decreasing amount may be calculated in S312. Processing advances to S317 if the brightness decreasing amount is at least the threshold, or to S313 if not (if the brightness decreasing amount is less than the threshold).

In S317, using the image processing unit 24, the system control unit 50 detects a region of an object located at the line-of-sight position in the live view image. For example, the system control unit 50 divides the live view image into a predetermined number of regions, and calculates similarity with the region of the line-of-sight position for each of the regions, based on the information on color and brightness of each region. Then the system control unit 50 determines a region of which similarity is higher than a predetermined threshold as a region of the object located at the line-of-sight position.

In S318, using the image processing unit 24, the system control unit 50 generates a mask to distinguish the region (line-of-sight region) detected in S317 from the other regions. The mask is for performing processing only on the line-of-sight region and disabling processing on the other regions (regions that are different from the line-of-sight region). In the present embodiment, a bit map image, in which the pixel values of the line-of-sight region are 1 and the pixel values of the other regions are 0, is generated as the mask.

The line-of-sight region is not limited to the region of the object located at the line-of-sight position. For example, the line-of-sight region may be a region which includes the object located at the line-of-sight position, and is larger than this object. The line-of-sight region may be another region which includes the line-of-sight position, such as a region of which distance from the line-of-sight position is not more than a predetermined distance (distance corresponding to a predetermined number of pixels), and which is constituted of a plurality of pixels. The size of the line-of-sight region may be a predetermined fixed size, or may be a size that is determined or changed in accordance with the display size (size on the live view image) of the object located at the line-of-sight position. For example, the line-of-sight region may be larger as the display size of the object located at the line-of-sight position is larger. The shape of the line-of-sight region is not especially limited, and may be a circle (e.g. perfect circle, ellipse) or may be a polygon (e.g. triangle, hexagon).

In S319, using the image processing unit 24, the system control unit 50 changes the brightness of the line-of-sight region (region based on the line-of-sight position) specified by the mask generated in S318, out of the live view image. In the present embodiment, the system control unit 50 changes (increases) the brightness of the line-of-sight region by a change amount based on the brightness decreasing amount of the peripheral darkening (calculated in S316; light quantity based on the image height). The brightness of the line-of-sight region (pixels) is changed by multiplying the pixel values by a gain value, adding an offset value to the pixel values, and the like. Thereby in a case where the brightness of the line-of-sight region is lower than a threshold, for example, the brightness of the line-of-sight region is corrected to the brightness of this threshold. The brightness of the other regions (regions that are different from the line-of sight region) is not changed. The method of changing the brightness of the line-of-sight region is not especially limited. For example, brightness of each pixel of the lineof-sight region may be uniformly increased or decreased, or set closer to a predetermined brightness.

In the present embodiment, the brightness of the line-of-sight region (region based on the line-of-sight position) is controlled by the image processing on the displayed image, but may be controlled by local brightness control (partial control of display brightness) by the display device main body. For example, the display unit 28 and the EVF 29 may locally control the display brightness individually based on the size signals of the line-of-sight region on such a display as an LCD and an organic EL.

Further, in the present embodiment, the lightness of the image in the line-of-sight region is controlled, but the object of the present invention can also be achieved by a different method if the image of the line-of-sight region can be partially image-processed. Examples of the image processing that is partially performed on the image of the line-of-sight region are: white balance, color conversion, magnified display processing; and sharpening processing. With the image processing parameters in the line-of-sight region being changed, the image processing itself may be performed on the entire image. Using the image processing unit 24, the system control unit 50 performs the image processing partially on the line-of-sight region (region based on the line-of-sight position), which is specified by the mask generated in S318, out of the live view image, and displays the processed image sequentially on the EVF 29 as live view images.

After starting the image capturing mode processing in FIGS. 3 and 4, the system control unit 50 reads signals from the imaging unit 22 by the second shutter switch signal SW2, and writes the captured image to the recording medium 200 as an image file. In this case, the above mentioned brightness control (partial image processing) on the line-of-sight region (pixels) is not performed on the image to be recorded. However, both an image that is partially image-processed and an image that is not partially image-processed may be recorded as the recording images.

As described above, according to the present embodiment, the focusing control by the line-of-sight input (control to focus on an object in accordance with the line-of-sight position) is performed when the AF target fixing setting is disabled, and is not performed when the AF target fixing setting is enabled. On the other hand, the brightness control by the line-of-sight input (control of brightness of the line-of-sight region) is performed regardless whether the AF target fixing setting is enabled or not. Thereby the focusing control and the brightness control by the line-of-sight input can be performed properly (with good operability). For example, in the case of performing only the brightness control by the line-of-sight input, it can be prevented that the focusing control by the line-of-sight input is performed contrary to the user's intention.

Although the focusing control and the brightness control by the line-of-sight input have been described, setting of the imaging parameters may be changed by selecting an information icon displayed on the live view image using the line-of-sight input and operating the electronic dial and buttons. For example, in the case where the user is gazing at an information icon (e.g. shutter speed, aperture) displayed on the live view image indicating the camera set values, as illustrated in FIG. 6, the system control unit 50 displays this gazed information icon on the EVF 29 in the selected state (e.g. highlight display). In this state, set values of the imaging parameters (e.g. shutter speed, aperture, focal distance) corresponding to this information icon may be changed by the user turning the electronic dial, for example.

In the above description, various controls mentioned above are performed by the system control unit 50, but may be performed by one hardware component or by a plurality of hardware components (e.g. a plurality of processors and circuits) which share the processing to control the entire apparatus.

While the present invention has been described with reference to the preferred embodiments, the present invention is not limited to these specific embodiments, and includes various modes within the scope that does not depart from the essence of the invention. Furthermore, each of the above embodiments is merely an example of the invention, and may be combined as required.

For example, the case of changing the brightness of the line-of-sight region when the condition in which the brightness decreasing amount of the peripheral darkening is at least a predetermined threshold is satisfied was described, but the brightness of the line-of-sight region may be changed regardless whether this condition is satisfied or not. In other words, in FIG. 4, the processing steps S317 to S319 may always be performed with omitting S316. For the condition to determine whether the brightness of the line-of-sight region is changed or not, other conditions may be used. Further, while the example of fixing the AF target object in the case where the AF target is not determined in accordance with the line-of-sight position was described, the AF position (position to be focused on) may be fixed in the case where the AF target is not determined in accordance with the line-of-sight position. Furthermore, while an example of switching enable/disable of various settings (e.g. AF target fixing setting) in accordance with the user operation was described, enable/disable of various settings may be automatically switched in accordance with the image capturing scene, or the like.

As another AF target control method, the AF target setting may be switched by user operation, instead of always using the line-of-sight position to perform the AF target setting as in the case of the present embodiment. For example, in the case where the shutter switch signal SW1 (or operation from another independent operation member) is inputted, as illustrated in FIG. 7, the AF frame may move to an object displayed in the line-of-sight position so that this object may be determined as the AF target.

Figure 5:
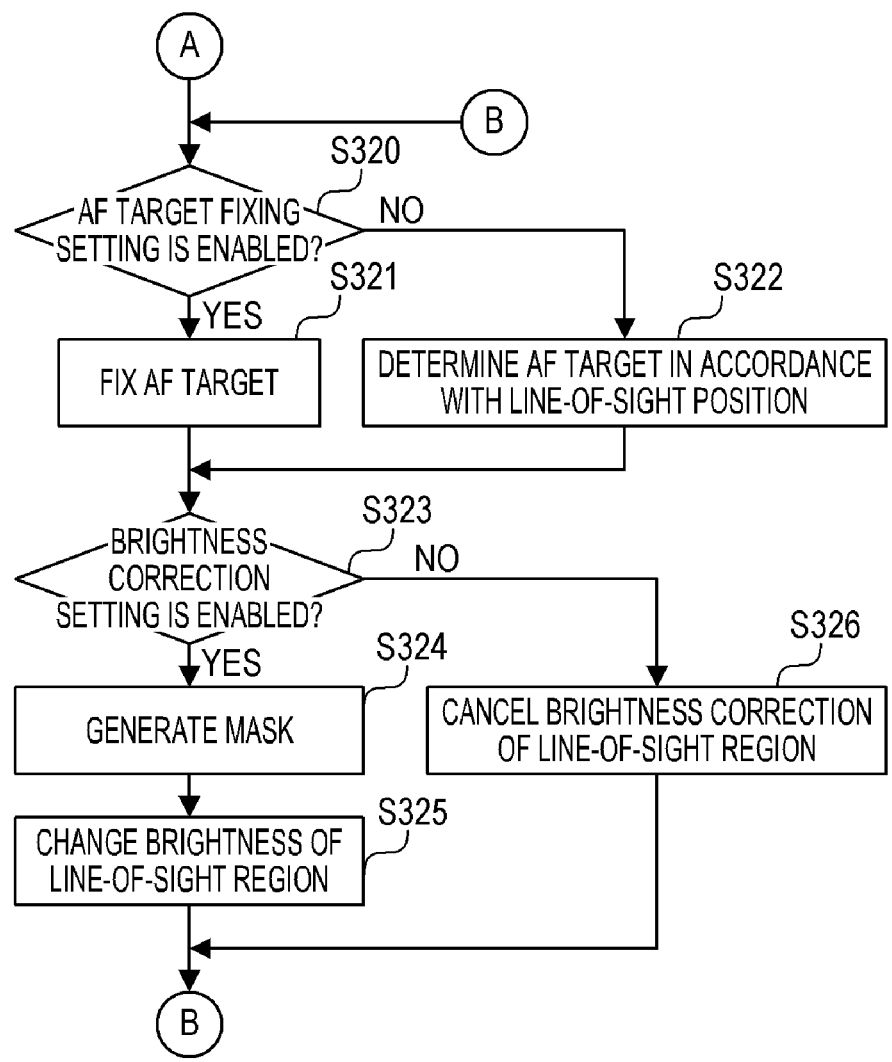
FIG. 5 is a part of the flow chart depicting the image capturing mode processing.

Instead of the processing in FIG. 4, the processing in FIG. 5 may be performed. According to the processing in FIG. 5, the focusing control by the line-of-sight input or the brightness control by the line-of-sight input is selectively executed, hence operability and user friendliness improve.

In S320, the system control unit 50 determines whether the AF target fixing setting is enabled or not. Processing advances to S321 if enabled, or to S322 if not.

In S321, the system control unit 50 fixes the AF target regardless the line-of-sight position.

In S322, the system control unit 50 determines the AF target in accordance with the line-of-sight position.

In S323, the system control unit 50 determines whether the brightness correction setting is enabled or not. The brightness correction setting is a setting to change (correct) the brightness of the line-of-sight region. Processing advances to S324 if enabled, or to S326 is not. Just like the case of the AF target fixing setting, the system control unit 50 switches enable/disable of the brightness correction setting in accordance with the operation to the operation unit 70. It should be noted that the operation member to switch enable/disable of the brightness correction setting is different from the operation member to switch enable/disable of the AF target fixing setting.

In S324, using the image processing unit 24, the system control unit 50 generates a mask to distinguish the line-of-sight region from the other regions. For example, a region, of which distance from the line-of-sight position is not more than a predetermined distance (distance corresponding to a predetermined number of pixels) and which is constituted of a plurality of pixels, is regarded as the line-of-sight region, and a bit map image, in which pixel values of the line-of-sight region are 1 and pixel values of the other regions are 0, is generated as the mask.

In S325, using the image processing unit 24, the system control unit 50 changes the brightness of the line-of-sight region specified by the mask generated in S324, out of the live view image. For example, the system control unit 50 increases the brightness of a region, of which brightness is lower than a predetermined brightness, to this predetermined brightness. The brightness of the other regions (regions different from the line-of-sight region) is not changed.

In S326, using the image processing unit 24, the system control unit 50 cancels the brightness correction of the line-of-sight region. Thereby the brightness of the line-of-sight region becomes the brightness before the change in S325.

In the above embodiment, a case of applying the present invention to a digital camera (imaging device) was described as an example, but the present invention is not limited to this, but is applicable to any electronic device which can receive line-of-sight input. For example, the present invention is applicable to a personal computer, a PDA, a portable telephone terminal, a portable image viewer, a printer, a digital photo frame, a music player, a game machine, an electronic book reader, a video player, and the like. The present invention is also applicable to a wearable device (e.g. a head mount display (HMD)), a display device (including a projector), a tablet terminal, a smartphone, an AI speaker, a home electronic appliance, an onboard device, medical equipment, and the like. The processing to receive the line-of-sight input may be a processing to detect the line of sight, or may be a processing to acquire information on a line of sight detected by an external device. The electronic device to which the present invention is applied is required only to acquire images captured by a predetermined imaging control, and the image capturing itself may be performed by an external device.

According to this disclosure, a plurality of controls (processing steps), such as a focusing control and a brightness control by the line-of-sight input, can be performed properly (with good operability).

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038856, filed on Mar. 6, 2020, and Japanese Patent Application No. 2021-000771, filed on Jan. 6, 2021, which are hereby incorporated by reference herein in their entirety.

What is claimed is:

1. An electronic device comprising:
a first operation member configured to receive a first operation input by touch of a user;
a second operation member, configured to receive a second operation input, which is different from the first operation input, by touch of the user; and
at least one memory and at least one processor which function as:
a line-of-sight input unit configured to receive a line-of-sight input by a line of sight of the user who looks at a display separate and distinct from the first operation member and separate and distinct from the second operation member;
an acquisition unit configured to acquire an image that is captured by an image sensor;
a display control unit configured to display the image, which is acquired by the acquisition unit, on the display; and
a control unit configured to, in a state where the image is displayed on the display by the display control unit and the line of sight is received on a part of the image,
perform setting of a focal point detection region for focusing on an object on a basis of the part of the image, in a case where the first operation input is performed, and
perform image processing to change an image processing parameter of the part of the image displayed on the display, in a case where the second operation input is performed.

2. The electronic device according to claim 1, wherein the setting of the predetermined imaging parameter is setting of an imaging parameter corresponding to an icon displayed in the line-of-sight position.

3. The electronic device according to claim 1, wherein the imaging parameter includes at least one of an aperture value, a shutter speed and a focal distance.

4. The electronic device according to claim 1, wherein the image processing is processing to increase brightness of a region corresponding to the line-of-sight position, in the image displayed on the display.

5. The electronic device according to claim 4, wherein in a case where the brightness of the region is lower than a threshold, the control unit corrects the brightness of the region to brightness of the threshold.

6. The electronic device according to claim 1, wherein the image processing is processing on a region corresponding to the line-of-sight position in the image displayed on the display.

7. The electronic device according to claim 1, wherein the control unit
performs image processing on the image displayed on the display on a basis of the line-of-sight position in a case where the second operation input is performed, and
records an image to be recorded in a recording medium, without performing the image processing.

8. The electronic device according to claim 1, wherein the display control unit displays an indicator corresponding to the line-of-sight position.

9. The electronic device according to claim 8, wherein the setting of the predetermined imaging parameter is different from displaying of the indicator.

10. The electronic device according to claim 1, wherein in the state where the image is displayed on the display by the display control unit, the control unit switches between performing setting of the predetermined imaging parameter on a basis of a part of the image in an area corresponding to the line-of-sight position and fixing of the predetermined imaging parameter based on the part of the image, on a basis of the first operation input.

11. The electronic device according to claim 1, further comprising the image sensor,
wherein the control unit controls the image sensor with the predetermined imaging parameter, and
the display control unit displays a live view image captured by the image sensor on the display.

12. An electronic device comprising:
a first operation member configured to receive a first operation input by touch of a user;
a second operation member, configured to receive a second operation input, which is different from the first operation input, by touch of the user; and
at least one memory and at least one processor which function as:
a line-of-sight input unit configured to receive a line-of-sight input by a line of sight of the user who looks at a display separate and distinct from the first operation member and separate and distinct from the second operation member;
an acquisition unit configured to acquire an image that is captured by an image sensor;
a display control unit configured to display the image, which is acquired by the acquisition unit, on the display; and
a control unit configured to, in a state where the image is displayed on the display by the display control unit and the line of sight is received on a part of the image,
perform setting of a focal point detection region for focusing on an object on a basis of the part of the image, in a case where the first operation input is performed, and
perform partial control of display brightness of the display on a basis of the line-of-sight position in a case where second operation input is performed.

13. A control method of an electronic device, comprising:
receiving a line-of-sight input by a line of sight of a user who looks at a display;
acquiring an image that is captured by an image sensor;
displaying the acquired image on the display;
receiving, at a first operation member that is separate and distinct from the display, a first operation input by touch of the user;
receiving, at a second operation member that is separate and distinct from the display, a second operation input, which is different from the first operation input, by touch of the user;
performing setting of a focal point detection region for focusing on an object on a basis of a part of the image, in a case where the first operation input is performed in a state where the image is displayed on the display and the line of sight is received on the part of the image; and
performing image processing to change an image processing parameter of the part of the image displayed on the display, in a case where the second operation input is performed in a state where the image is displayed on the display.

14. A control method of an electronic device, comprising:
receiving a line-of-sight input by a line of sight of a user who looks at a display;
acquiring an image that is captured by an image sensor;
displaying the acquired image on the display;
receiving, at a first operation member that is separate and distinct from the display, a first operation input by touch of the user;
receiving, at a second operation member that is separate and distinct from the display, a second operation input, which is different from the first operation input, by touch of the user;
performing setting of a focal point detection region for focusing on an object on a basis of a part of the image, in a case where the first operation input is performed in a state where the image is displayed on the display and the line of sight is received on the part of the image; and
performing partial control of display brightness of the display on a basis of the line-of-sight position in a case where second operation input is performed in a state where the image is displayed on the display.

15. A non-transitory computer readable medium that stores a program, wherein the program causes a computer to execute a control method of an electronic device, comprising:
receiving a line-of-sight input by a line of sight of a user who looks at a display;
acquiring an image that is captured by an image sensor;
displaying the acquired image on the display;
receiving, at a first operation member that is separate and distinct from the display, a first operation input by touch of the user;
receiving, at a second operation member that is separate and distinct from the display, a second operation input, which is different from the first operation input, by touch of the user;
performing setting of a focal point detection region for focusing on an object on a basis of a part of the image, in a case where the first operation input is performed in a state where the image is displayed on the display and the line of sight is received on the part of the image; and
performing image processing to change an image processing parameter of the part of the image displayed on the display, in a case where the second operation input is performed in a state where the image is displayed on the display.

16. A non-transitory computer readable medium that stores a program, wherein the program causes a computer to execute a control method of an electronic device, comprising:

receiving a line-of-sight input by a line of sight of a user who looks at a display;
acquiring an image that is captured by an image sensor;
displaying the acquired image on the display;
receiving, at a first operation member that is separate and distinct from the display, a first operation input by touch of the user;
receiving, at a second operation member that is separate and distinct from the display, a second operation input, which is different from the first operation input, by touch of the user;
performing setting of a focal point detection region for focusing on an object on a basis of a part of the image, in a case where the first operation input is performed in a state where the image is displayed on the display and the line of sight is received on the part of the image; and
performing partial control of display brightness of the display on a basis of the line-of-sight position in a case where second operation input is performed in a state where the image is displayed on the display.

17. An electronic device comprising:
a first operation member configured to receive a first operation input by touch of a user;
a second operation member, configured to receive a second operation input, which is different from the first operation input, by touch of the user; and
at least one memory and at least one processor which function as:
a line-of-sight input unit configured to receive a line-of-sight input by a line of sight of a the user who looks at a display separate and distinct from the first operation member and separate and distinct from the second operation member;
an acquisition unit configured to acquire an image that is captured by an image sensor;
a display control unit configured to display the image, which is acquired by the acquisition unit, on the display; and
a control unit configured to, in a state where the image is displayed on the display by the display control unit and the line of sight is received on a part of the image,
perform setting of a predetermined imaging parameter on a basis of the part of the image, in a case where the first operation input is performed, and
perform image processing to change an image processing parameter of the part of the image displayed on the display, in a case where the second operation input is performed,
wherein the setting of the predetermined imaging parameter is setting of a focal point detection region for focusing on an object corresponding to the line-of-sight position, and
wherein the image processing is processing to change an image processing parameter of a region corresponding to the line-of-sight position in the image displayed on the display.

18. A control method of an electronic device, comprising:
receiving a line-of-sight input by a line of sight of a user who looks at a display;
acquiring an image that is captured by an image sensor;
displaying the acquired image on the display;
receiving, at a first operation member that is separate and distinct from the display, a first operation input by touch of the user;
receiving, at a second operation member that is separate and distinct from the display, a second operation input, which is different from the first operation input, by touch of the user;
performing setting of a predetermined imaging parameter on a basis of a part of the image, in a case where the first operation input is performed in a state where the image is displayed on the display and the line of sight is received on the part of the image; and
performing image processing to change an image processing parameter of the part of the image displayed on the display, in a case where the second operation input is performed in a state where the image is displayed on the display,
wherein the setting of the predetermined imaging parameter is setting of a focal point detection region for focusing on an object corresponding to the line-of-sight position, and
wherein the image processing is processing to change an image processing parameter of a region corresponding to the line-of-sight position in the image displayed on the display.

19. A non-transitory computer readable medium that stores a program, wherein the program causes a computer to execute a control method of an electronic device, comprising:
receiving a line-of-sight input by a line of sight of a user who looks at a display;
acquiring an image that is captured by an image sensor;
displaying the acquired image on the display;
receiving, at a first operation member that is separate and distinct from the display, a first operation input by touch of the user;
receiving, at a second operation member that is separate and distinct from the display, a second operation input, which is different from the first operation input, by touch of the user;
performing setting of a predetermined imaging parameter on a basis of a part of the image, in a case where the first operation input is performed in a state where the image is displayed on the display and the line of sight is received on the part of the image; and
performing image processing to change an image processing parameter of the part of the image displayed on the display, in a case where the second operation input is performed in a state where the image is displayed on the display,
wherein the setting of the predetermined imaging parameter is setting of a focal point detection region for focusing on an object corresponding to the line-of-sight position, and
wherein the image processing is processing to change an image processing parameter of a region corresponding to the line-of-sight position in the image displayed on the display.

* * * * *